United States Patent Office 3,041,190
Patented June 26, 1962

---

3,041,190
COMPOSITIONS AND PROCESSES FOR MAKING FOAMED ALUMINA REFRACTORY PRODUCTS, AND ARTICLES SO PRODUCED
James S. Griffith, Chicago, Rangwald S. Olsen, Evanston, and Harold L. Rechter, Chicago, Ill., assignors, by mesne assignments, to E. I. du Pont de Nemours and Company, Wilmington, Del., a corporation of Delaware
No Drawing. Filed Dec. 1, 1959, Ser. No. 856,374
9 Claims. (Cl. 106—40)

This invention relates to foamed alumina compositions, processes, and articles, and is more particularly directed to compositions for producing alumina foams, the compositions comprising an organic foamer and colloidal alumina having the boehmite (AlOOH) crystal structure and is further directed to processes for producing refractory products having low thermal conductivity, comprising whipping an inert gas into an aqueous dispersion of said alumina-foamer composition to form a wet foam, drying the foam at a temperature of up to 150° C., and firing the dried product at a temperature of up to 1700° C. until ceramic bonding occurs, is further directed to said processes in which there is included with the composition foamed an inorganic, particulate, ceramic fortifier selected from the group consisting of larger-than-colloidal aluminum oxide, alumino-silica compositions having the mullite ratio ($3Al_2O_3 \cdot 2SiO_2$), aluminum phosphates, amorphous silica, zirconia, zircon, and calcium aluminate hydraulic cements, whereby the foam upon drying and after firing is in monolithic form, and is still further directed to the dried foam structures produced according to the processes.

Alumina in the form of hollow, shot-like spheres or porous monolithic structures has already been proposed as an insulating medium for use at relatively high temperatures. The products hitherto available, however, have been relatively dense and heavy, and their thermal conductivity has not been as low as desired. From considerations heretofore known it was not apparent how the thermal conductivity of the alumina products available could be reduced.

In the manufacture of monolithic structures such as building bricks or poured walls using hydraulic-setting cements it has hitherto been recognized that the structures obtained would have better heat insulating efficiency if they could be made porous, and various expedients have been proposed for accomplishing this result. In systems where the porosity is sought to be achieved by foaming the aqueous cement mix, difficulty is encountered in maintaining the foam until the hydraulic setting of the cement has been accomplished. Various foaming agents can be added to the aqueous cement mix to give temporary foams when an inert gas such as air is whipped or blown into the wet cement mix, but unfortunately the foam collapses relatively soon after the blowing or whipping of the inert gas is stopped and the structures obtained are accordingly less porous than is desired.

While there has been a recognized need for a stabilizer for foams of cementitious materials, no such material has hitherto been available. Particularly there has been no suggestion of a material especially suitable in foams to be used as thermal insulation at relatively high service temperatures.

Recently there has become available a novel form of alumina which is a unique, water-dispersible, colloidal alumina having the boehmite (AlOOH) crystal structure, in which the alumina particles are in the form of minute fibrils. According to the present invention it has been found that this colloidal alumina contributes remarkable stability to wet foams containing it and that such foams can be dried and fired to give particles or granules having very low thermal conductivity and sufficient physical strength to be useful as thermal insulation. It has further been found that by including in the foams an inorganic, particulate, ceramic fortifier or reinforcing agent, such as aluminum oxide of larger-than-colloidal dimensions or calcium aluminate hydraulic cement, the foams can be dried and fired to give monolithic structures having relatively high physical strength in relation to their density and thermal conductivity.

In the novel compositions and structures the colloidal alumina acts as a foam stabilizer during drying, so that drying can be effected before undue collapse of the foam has occurred. In the case of hydraulic cements this means that setting of the cement can take place while the mixture is in a highly foamed condition. With other foam compositions it means that the foams can be made to persist during drying and until ceramic bodies have been formed therefrom by firing.

THE FOAMABLE COMPOSITIONS

The foamable compositions comprise, as essential constituents, the colloidal alumina and organic foamers. It will be understood that water will be added prior to the foaming operation, but the water is advantageously omitted from compositions which are to be transported and stored for extensive periods prior to use.

The colloidal alumina employed can be any of the products described and claimed in United States patent application Serial No. 783,602, filed December 29, 1958, by John Bugosh, now U.S. Patent 2,915,475. Such products can be described broadly as being readily dispersible, pulverulent, fibrous alumina monohydrate having the boehmite crystal lattice and being made up of alumina fibrils which have a surface area of 200 to 400 m.²/g. and an average length of 25 to 1500 millimicrons, the axial ratio of such fibrils, by computation from the said surface area and average lengths, ranging from 3.76:1 to 451:1. An available product within this description has the following chemical composition and physical properties:

Chemical Composition

| | |
|---|---|
| Percent AlOOH | 81.5. |
| Percent $CH_3COOH$ | 9.5. |
| Percent $H_2O$ | 6.6. |
| Percent Na | 0.16. |
| Percent $NH_4$ | 0.13. |
| Percent $SO_4$ | 1.8. |

Trace Impurities

| | |
|---|---|
| Percent Fe | 0.13. |
| Percent Ca | 0.007. |
| Percent Cu | 0.002.[1] |
| Percent Pb | Not detected.[1] |
| Percent $SiO_2$ | 0.05. |

Physical Properties

| | |
|---|---|
| Specific surface area (m.²/g.) | 256. |
| Pore volume (cc./g. at 120° C.) | 0.46. |
| Pore diameter (A.) | 73. |
| pH 4% sol | 4.3. |

See footnotes at end of table.

Viscosity—4% sol (cps.)[2]:
- At pH=2.0 _____ 6.
- At pH=4.0 _____ 29.
- At pH=5.0 _____ 430.
- At pH=6.0 _____ 3,850 (grease-like).
- At pH=9.0 _____ 390 (floc).

Absolute density (g./cc.) _____ 2.25.

Bulk density:
- Loose (lb./ft.$^3$) _____ 20.
- Packed (lb./ft.$^3$) _____ 36.

Refractive index, $n_{25}^D$ _____ 1.55.
Oil absorption _____ 89.[3]
Particle charge _____ Positive.
Color _____ White.

[1] By spectrographic analyses.
[2] Brookfield viscometer at 60 r.p.m. after 20 hours.
[3] ASTM specification D-281-31.

Organic foaming agents for aqueous systems are already well known, and any such foamer can be used with the colloidal alumina. The colloidal alumina itself is not here used as a foaming agent but acts primarily to stabilize the foam formed when a gas is whipped into an aqueous mixture containing the organic foamer. Accordingly, an agent which when dissolved or dispersed in water to the extent of about .5% by weight will cause a foam to be formed on the water when the solution or dispersion is whipped with air can be used as the foamer.

More particularly, any of the foamers used in froth-flotation processes for recovery of ores can, for instance, be employed. Alkyl sulfates, alkyl aryl sulfonates such as sodium dodecyl sulfate, or alkyl aryl sulfonates such as butyl phenyl sodium sulfonate, give good results, as do alcohols of low to moderate molecular weights, amyl alcohol being a particularly effective material. Other agents often employed are neutralized vinsol resin, cresol, toluidene, soaps, amines, proteins, pine oils including terpenes, etc., and saponins. In general they have structural formulas in which two dissimilar groups are present, one group being nonpolar and the other polar. Particularly preferred are those polar compounds containing only one polar group. This polar group can be the oxygen of a hydroxyl, carboxyl or carbonyl group or the nitrogen of an amine or nitrile group. Many of the most suitable foamers are anionic, but compounds which are definitely cationic such as long-chain, quaternary ammonium salts, or nonionic, such as polyethylene oxide condensates can be used.

A particularly effective foamer is a protein-based, surface-active agent obtained from fish scales.

Pigment dispersion stabilizers such as ammoniated casein, alkali salts of lignin sulfonates, or sulfated naphthalene-formaldehyde condensation products can be used to advantage in the compositions to enhance the action of the foamer.

The proportions of colloidal alumina and organic foamer in the foamable compositions can be widely varied. In some instances as little as .25% by weight of foamer, based on the total weight of solids in the foamable composition, will suffice for the preparation of useful foams from the composition. Ordinarily, amounts larger than 20% by weight on the same basis contribute no added advantage and complicate the problem of burning out the foamer when it is desired that the ultimate foam body be completely inorganic. In preferred compositions the amount of foamer will range from .5% to 10% by weight of the total solids present.

When the product ultimately desired is a foamed, monolithic body the foamable composition will contain, in addition to the colloidal alumina and foamer, an inorganic, particulate, ceramic fortifier or foam strengthening agent selected from the group consisting of aluminum oxide particles having larger-than-colloidal dimensions, alumino-silica compositions having the mullite ratio, aluminum phosphates, amorphous silica, zirconia, zircon, and calcium aluminate hydraulic cements. The presence of one or more of these agents reduces shrinkage of the foam upon drying and firing and thus increases enormously the practicability of the foamable compositions.

When there is sulfate present in the colloidal alumina or in the ceramic fortifier it is often desirable to precipitate such sulfate when forming the foam. This can be done by including a soluble barium compound such as barium hydrate or barium acetate as a component of the foamable compositions.

It will be understood that other specific materials can be added to the foamable compositions to give particular effects. For instance, minor amounts of calcium or ammonium alginate dispersion can be added for additional foam stabilization and for neutralizing any acid content of the colloidal alumina. Aluminum silicate fibers, asbestos fibers, silica fibers, fibrous potassium titanate, etc., perferably of short length, can be included for eliminating drying and firing shrinkage cracks. Other fibrous materials, preferably of inorganic character, can be added for the same purpose. Ammonium phosphate, phosphoric acid, or sodium or potassium silicates can be added as low-temperature bonding agents, but for ultimate products which are to be used at maximum service temperatures the presence of such binders is sometimes not preferred. Clays can also be included as fillers, although often the clay will also serve to strengthen the foam and may be included as a source of alumina and silica in the above-mentioned mullite compositions.

The ceramic fortifier and the optional inclusions just mentioned, when present, can constitute a major proportion of the foamable composition. As already mentioned the foamer is present in minor proportions. Thus, the foamer can constitute from .25 to 20% of the dry solids in the foamable composition and the colloidal alumina and optional inclusions can make up the rest of the mixture. Ordinarily, of said remainder the colloidal alumina will amount to at least 1/50—that is, 2% by weight based upon the total solids in the composition—and preferably will range upwards of 50%. It can, of course, constitute the entire remainder of the composition over and above the foamer.

THE PROCESSES FOR MAKING FOAMED PRODUCTS

To make a mixture suitable for whipping with an inert gas a colloidal alumina-foamer composition as above described is first mixed with enough water to make a fluid, aqueous dispersion. It will be understood that for the purposes of the process the foamer and colloidal alumina can be separately added to the water but for greatest facility of operation and to insure proper proportioning pre-mixed material is used. The amount of water necessary to give the desired fluidity will vary widely depending upon the surface area and coaxial ratio of the alumina used, and particularly if other ingredients such as the foam fortifiers are present or are to be added prior to foaming. Ordinarily, the solids content, including the foamer, present in the aqueous dispersion will be at least 5% and will usually not exceed about 75% because at concentrations much higher than this the dispersions are not sufficiently fluid.

The aqueous dispersion is foamed by whipping an inert gas into it. For all practical purposes air is satisfactory as the inert gas and is used, but other inert gases such as nitrogen or argon can be employed. In the descriptions which follow, reference will be made to air as representative of the inert gas.

The air can be whipped into the aqueous dispersion by any means capable of distributing it in the form of small bubbles throughout the dispersion. The art is already familiar with such means in other processes and any of these can be used. For instance, air can be bubbled in through a porous carbon or fritted glass filter or through a stainless steel screen or other means for breaking up the air into small bubbles. Alternatively, and especially preferred, one can employ the mechanical beaters of the type used for whipping air into rubber latex to make rubber foams or used for whipping cream in bakeries. The important consideration is to distribute the air throughout the dispersion as small bubbles.

In the presence of the fibrous colloidal boehmite alumina the foam, once formed, is relatively stable. For purposes of the present disclosure the term "stable" as applied to the foam will mean that the foam persists without undue collapse for at least one -half hour. Such stability in the foam gives sufficient time for the low-temperature drying without collapse.

The foam is dried at a temperature up to about 150° C. To minimize shrinkage the drying can be initiated at temperatures considerably below this maximum as, for instance, by air drying at normal room temperature (about 25° C.), followed by oven drying at 100 to 110° C. In this drying step the free water and some loosely adsorbed water is removed but ordinarily, little or no water of composition is driven off.

Shrinkage cracking upon drying can usually be minimized by using a slow rate of drying, especially in the initial stages. The art is already acquainted with techniques for drying ceramic slips and such knowledge can be employed to advantage in drying the ceramic foams of this invention.

After the initial drying the inorganic foam has sufficient strength that it can be fired at temperatures up to 1700° C. without collapse. Again, the techniques well known in the ceramic art for firing dense, solid, ceramic products can be applied to the firing of the foams. For instance, by slowing down the rate of heating up to the maximum firing temperature and of cooling down from this temperature the extent of shrinkage and warpage can be minimized.

During the firing step changes of composition occur in the foam, but at this point the physical structure has become fixed so that these chemical changes do not radically alter it. The chemical changes referred to include the dehydration of the colloidal alumina by loss of water of composition and the removal of the organic foamer, either because it is volatile at the temperatures involved or because it is burned out by contact with air at these high temperatures.

It will be understood that during the low-temperature drying step hydraulic cements such as calcium aluminate cements, if present, will set hydraulically and the monolithic structures produced will have valuable utility even without the subsequent firing. However, for foam products having the maximum degree of insulating value—that is, the lowest thermal conductivity—firing of the foam is desired.

The effect of the firing at high temperature is to produce ceramic binding in the physical structure, thus giving products suitable for service at very high temperatures—that is, temperatures close to the firing temperature.

In the above-described processes any of the inorganic, particulate, ceramic fortifiers and any of the various other additives already discussed can be included in the aqueous dispersion which is formed. The effect of such inclusions has already been discussed, but it can further be pointed out that the presence of the ceramic fortifier reduces shrinkage cracking to such an extent that monolithic structures are produced whereas when such fortifiers are not present or are present in insufficient quantity the fired product is in the form of granules or intumesced particles resembling puffed wheat or puffed rice.

THE DRY FOAM PRODUCTS

The dry foam products obtained according to the above-described processes of the present invention are lighter in weight than comparable products hitherto available. For instance, the intumesced granules prepared without use of a ceramic fortifier, after firing at 1300° F. and crushing to a sieve size of 4 to 20 mesh have a bulk density of about 10 pounds per cubic foot. This is very substantially less than the so-called "bubbled" alumina products heretofore available.

The monolithic structures, of course, have a higher density than the granules, but their densities are nevertheless substantially below those of comparable, self-supporting, monolithic structures previously produced. The monolithic structures in any event have a bulk density less than 50 pounds per cubic foot.

The granular products of the invention have utility as loose-packed insulation, particularly in high-temperature applications, since the thermal conductivity of this material is extremely low and its resistance to decomposition or loss of porosity at high temperatures is excellent.

The monolithic structures have sufficient strength to be used as materials of construction, particularly where they are not required to bear any load other than their own weight. They are useful, for instance, as coverings for tanks and autoclaves in which very high temperature reactions are to be carried out and can also be used as linings for furnaces. In the form of bricks or building blocks they can be assembled in any desired structure for containing or excluding heat at very high temperature levels—that is, at temperatures in the range of 1000 to 1500° C. or even higher.

Examples

The invention will be better understood by reference to the following illustrative examples.

EXAMPLE 1

This example describes the preparation of a type of foam which will shrink, upon drying, into granules of very low density and thermal conductivity.

A foamable composition is made by dispersing in 400 grams of water 80 grams of a colloidal alumina having the boehmite crystal structure, having a specific surface area of about 256 square meters per gram, an AlOOH content of about 81.5%, an acetic acid content of about 9.5%, an $H_2O$ content of about 6.6% and having the other chemical and physical properties above described for a product of this character, and adding to this .8 gram of barium oxide, and adding to the suspension 10 grams of a protein-based, surface-active foaming agent derived from fish scales and 7.5 grams of a 50% by weight aluminum phosphate sol. The dispersion is whipped into a foam with air by beating it in an electric mixer of the "egg-beater" type. After about three minutes of beating the foam is spooned into a form and dried at about 110 to 115° C.

The product obtained is in the form of granules which can be fired at any desired temperature, with little shrinkage occurring below 1700° C. A portion of the material fired at 1300° F. and crushed to a sieve size of 4 to 20 mesh has a bulk density of about 10 pounds per cubic foot and a thermal conductivity of 0.336 B.t.u./ft.$^2$/in./° F.

EXAMPLE 2

This example illustrates how fibrous colloidal alumina having the boehmite crystal structure acts as a foam stabilizer for calcium aluminate hydraulic cements and as a secondary binder and refractory component of foams produced therewith.

A foamable aqueous dispersion is prepared as follows: A 100-gram portion of high-quality, commercial calcium aluminate hydraulic cement is blended with 400 grams of 325-mesh, calcined alumina in 200 grams of water in the mixer used in Example 1. To this is added 100 grams of an aqueous dispersion of the colloidal alumina employed in Example 1 said dispersion containing 2% by weight of baria. This mixture is beaten at slow speed and there is then added 10 grams of the foamer used in Example 1, dispersed in 100 grams of water. Air is then whipped into the dispersion to form a foam by mixing the dispersion at the maximum speed of the beater. During the beating 50 grams of a 2% by weight ammonium alginate dispersion is added to further stabilize the foam and neutralize the acid content of the colloidal alumina. Also, there is added 15 grams of short-length aluminum silicate fiber to eliminate drying and firing shrinkage cracks later in the process.

About three minutes of beating produces the maximum foam. The mix is then troweled into a mold and allowed to set. The hydraulic bond of calcium aluminate develops over a period of one-half to twenty-four hours. The foam is then dried at about 110° C. Monolithic structure is obtained showing very little shrinkage and no cracking. Firing this shaped, foam body at 1100 to 1300° C. results in a loss of strength due to dehydration, but at 1400° C. ceramic bonding occurs with 5% shrinkage. Further heating to 1600° C. results in further toughening and another 5% of dimensional shrinkage. The density of the final product is about 40 pounds per cubic foot.

The effect of the colloidal alumina addition in this example is demonstrated by repeating the experiment and leaving out the colloidal alumina. It is found that the product obtained in the foaming step is not a stable foam but rather, the foam collapses. Moreover, the product without the colloidal alumina is less refractory, less dimensionally stable, shows less strength, thermal shock resistance and poor insulating properties.

EXAMPLE 3

This example illustrates the use of fibrous colloidal alumina of the boehmite crystal structure in the formation of alumino-silicate foam structures which are exceptionally strong in relation to their pore volume after drying and firing. They are stronger than calcium aluminate foams but undergo more shrinkage.

The foam, which is essentially mullite ($3Al_2O_3 \cdot 2SiO_2$) after firing and has good monolithic properties, is prepared as follows: In a high-shear mixer of the Waring Blendor type 20 grams of aluminum silica fibers is mixed with 50 grams of water and 121 grams of a 30% $SiO_2$ colloidal silica solution having an $SiO_2:Na_2O$ ratio of about 285:1, so that the ratio reads: 285:1 and containing said silica in the form of substantially discrete particles having an average size of about 15 millimicrons. As soon as the fibers are dispersed there is added to the suspension 200 grams of 325-mesh alumina, 60 grams of zircon, and 20 grams of clay, together with 25 grams of water. Next is added 5 grams of a protein-based, surface-active foaming agent obtained from fish scales together with about 24 grams of the colloidal alumina boehmite fibers of Example 1 dispersed in 150 grams of water, and an additional 100 grams of water is added with this mixture. Twenty-five grams of a 50% monoaluminum phosphate dispersion and 50 grams of water are pre-mixed and added to the mixer. Finally 25 grams of a 1.5% by weight ammonium alginate suspension is added.

The mix is foamed by beater action in the mixing bowl as additions are made. The product obtained is a stable foam which is dried at 110° C. and is then fired at 1500° C. to obtain ceramic bonding. After firing the product is in the form of a monolithic structure which has high porosity and low thermal conductivity in proportion to its strength. The ratio of materials in this example is based on the mullite stoichiometry with excess alumina for maximum service temperature.

In the foregoing example colloidal silica can be eliminated and the silicate portion can be obtained from kaolin and other sources to produce equally tough and stable foams.

Similarly, in Examples 1 to 3 powdered soap bark can be substituted for the foamer although, using soap bark, the amount must be increased substantially to produce the same degree of foaming.

We claim:
1. A composition for producing an alumina foam, the composition comprising fibrous colloidal alumina having the boehmite crystal structure and consisting of alumina fibrils which have a surface area of 200 to 400 square meters per gram and an average length of 25 to 1500 millimicrons, the axial ratio of such fibrils, by computation from said surface area and average length, ranging from 3.76:1 to 451:1, and an organic foamer, said foamer being present in the proportion of from .25 to 30% and said alumina being present in the proportion of from 2% to the balance of the mixture, both percentages being by weight based on the total weight of solids in the composition.

2. A composition of claim 2 in which there is additionally present an inorganic, particulate, ceramic fortifier selected from the group consisting of larger-than-colloidal aluminum oxide, alumino-silica compositions having the mullite ratio, aluminum phosphates, amorphous silica, zirconia, zircon, and calcium aluminate hydraulic cements.

3. In a process for producing refractory products having low thermal conductivity the steps comprising whipping an inert gas into an aqueous dispersion comprising a mixture of at least 2% of colloidal alumina having the boehmite crystal structure and at least 0.25% of an organic foamer, both percentages being by weight based on the total weight of solids in the mixture, to form a wet foam, drying the foam at a temperature of up to 150° C., and firing the dried product at a temperature of up to 1700° C. until ceramic bonding occurs.

4. In a process for producing refractory products having low thermal conductivity the steps comprising whipping air into an aqueous dispersion comprising fibrous colloidal alumina having the boehmite crystal structure and an organic, anionic foamer, said foamer being present in a proportion of from .25 to 20% and said alumina being present in the proportion of from 2% to the balance of the mixture, both percentages being by weight based on the total weight of solids in the dispersion, drying the foam at a temperature of up to 150° C., and firing the dried product at a temperature of up to 1700° C. until ceramic bonding occurs.

5. A process of claim 5 in which there is also included in the aqueous dispersion an inorganic, particulate, ceramic fortifier selected from the group consisting of larger-than-colloidal aluminum oxide, alumina-silica compositions having the mullite ratio, aluminum phosphate, amorphous colloidal silica, colloidal zirconia, zircon, fused silica, and calcium aluminate hydraulic cements.

6. In a process for producing refractory products having low thermal conductivity the steps comprising whipping air into an aqueous dispersion comprising fibrous colloidal alumina having the boehmite crystal structure, an organic foamer, and a calcium aluminate hydraulic cement, said foamer being present in a proportion of from .25 to 20% and said alumina being present in the proportion of from 2% to the balance of the mixture, both percentages being by weight based on the total weight of solids in the dispersion, and drying the foam at a temperature of up to 150° C.

7. Granules consisting essentially of an intumesced foam of colloidal alumina having the boehmite crystal structure, said granules having a bulk density of about 10 pounds per cubic foot and a thermal conductivity less than about .35 B.t.u./ft.$^2$/in./° F.

8. A dry, monolithic, foam structure comprising colloidal alumina having the boehmite crystal structure, an organic, anionic foamer and a calcium aluminate hydraulic cement, said structure having a bulk density of about from 10 to 50 pounds per cubic foot, the proportion of foamer being at least .25% and of alumina being at least 2%, both percentages being by weight based on the total weight of solids present.

9. A dry, monolithic, foamed structure comprising a thermal decomposition product of colloidal alumina having the boehmite crystal structure upon heating to a temperature of from 150 to 1700° C., and an inorganic, ceramic fortifier selected from the thermal decomposition products in the same temperature range of a material selected from the group consisting of larger-than-colloidal aluminum oxide, alumino-silica compositions having the mullite ratio, aluminum phosphates, amorphous silica, zirconia, zircon, and calcium aluminate hydraulic cements.

References Cited in the file of this patent

UNITED STATES PATENTS

| | | |
|---|---|---|
| 1,682,675 | Horsfield | Aug. 28, 1928 |
| 2,235,881 | France | Mar. 25, 1941 |
| 2,292,012 | Parsons | Aug. 4, 1942 |
| 2,507,131 | Winston et al. | May 9, 1950 |
| 2,915,475 | Bugosh | Dec. 1, 1959 |